United States Patent Office 3,594,311
Patented July 20, 1971

3,594,311
CONVERSION PROCESS
Vincent J. Frilette, Delaware Township, Camden County, N.J., and Paul B. Weisz, Media, Pa., assignors to Mobil Oil Corporation
No Drawing. Continuation-in-part of application Ser. No. 754,915, Aug. 14, 1958, now Patent No. 3,140,322. This application Mar. 19, 1963, Ser. No. 266,186
The portion of the term of the patent subsequent to July 7, 1981, has been disclaimed
Int. Cl. C10g 13/02, 11/02
U.S. Cl. 208—111
21 Claims

ABSTRACT OF THE DISCLOSURE

Normal aliphatic hydrocarbons in a feed are selectively cracked or hydrocracked by contacting said feed under conversion conditions with a crystalline acid aluminosilicate having a pore size of about 5 angstroms, and a silicon to aluminum ratio of at least 1.8.

---

This application is a continuation-in-part of application Ser. No. 754,915, filed Aug. 14, 1958, now U.S. Pat. 3,140,322.

This invention relates to a novel method for conducting conversion processes with specific and unusual selectivity towards certain reaction paths, and for reacting certain specific compounds from a mixture of reactants. More particularly, the present invention is directed to a method for selectively conducting chemical reactions in the presence of a novel crystalline solid having (a) a high degree of activity, (b) rigid three-dimensional networks with interstitial dimensions such that only reactant or product molecules of suitable size and shape may be transported in either direction between the exterior phase and the interior thereof, (c) catalytic activity located within the interior of the crystalline solid, (d) pore sizes of about 5 angstrom units, and (e) a silicon to aluminum ratio of at least 1.8.

In particular, the invention described herein is concerned with catalytic processing carried out in the presence of a solid crystalline zeolitic structure of very well defined intracrystalline dimensions and wherein protons have replaced at least part of the alkali metal cations originally associated therewith, and which has the ability by reason of its intra-crystalline dimensions to allow the passage into or out of its crystalline cavities of only certain molecules, that is, of molecules having particular size or shape. By associating activity with the intracrystalline spaces for the chemical reaction system which is to be catalyzed, only such conversion paths are obtained which involve reactant or product molecules of such shapes or sizes. Such zeolites, wherein only molecules of particular size and shape are able to enter, are sometimes known as molecular filters or molecular sieves.

In accordance with this invention, catalytic selectivity is achieved by establishing catalytic reaction systems in which catalytically active surfaces are located within the intracrystalline volume of substances which act as molecular sieves and in which the sieve dimensions are in such relation to the chemical species involved in the catalytic reaction that only the selected species are allowed to pass the sieve structure; whereas unusually high catalytic activity is achieved by replacement of the metallic cations originally associated with the aluminosilicate with protons or proton precursors.

Absorbents which behave as molecular sieves have heretofore been utilized for effecting physical separation of mixtures of materials of varying molecular size. Such substances have been described by Barrer in several publications and in U.S. 2,306,610 and U.S. 2,413,134. Thus, molecular sieves are essentially the dehydrated forms of crystalline, natural and synthetic hydrous siliceous zeolites containing varying quantities of sodium, calcium and aluminum with or without other metals. The atoms of sodium, calcium, or metals in replacement thereof, silicon, aluminum and oxygen in these zeolites are arranged in the form of a crystalline salt in a definite and consistent crystalline pattern. This structure contains a large number of small cavities interconnected by a number of still smaller holes or channels. These cavities and channels are precisely uniform in size.

The instant invention is concerned with utilizing the crystalline structure of certain specific aluminosilicates for conducting conversion processes with specific selectivity toward certain reaction paths and at activities beyond those which have heretofore been possible.

The catalyst compositions used for purposes of the invention are crystalline or cryptocrystalline acid aluminosilicates which have an atomic ratio of silicon to aluminum of at least 1.8, a pore size of about 5 angstrom units and contain 0.5 to 1.0 equivalent of ions of positive valence per gram atom of aluminum. The ions of positive valence may consist entirely of hydrogen ions or of a non-metallic ion capable of conversion thereto, e.g., ammonium ions, including mixtures of hydrogen ions and ammonium ions. Alternatively, the aluminosilicate may contain non-metallic ions of positive valence in combination with metallic ions of Group I–A, such as sodium, potassium, lithium, cesium and rubidium, etc., wherein the metallic cation represents from 0.01 to 90 percent of the total equivalents of ions of positive valence per gram atom of aluminum.

Aluminosilicates having a pore size of about 5 angstrom units and a silicon to aluminum ratio of at least 1.8 are known in the art and include stilbite, offretite, chabazite, gmelinite, levynite, and analcite. Surprisingly, it has been found that materials of this type, activated by the introduction of proton or proton precursors, possess an extremely high degree of activity as well as selectivity for specific reactions. Therefore, the novel catalysts employed in the processes of this invention possess both an extremely high degree of activity and selectivity, whereas the catalysts heretofore employed had unusual selectivity but only at the price of diminishing activity.

There are two types of selective catalytic processing operations which will be accomplished by the application of the principles of this invention; and it will be helpful to characterize these broadly and to subsequently illustrate them by examples.

(1) In a reaction mixture containing the materials A, B, and c which would normally react catalytically to give the respective products A', B' and c', it is possible to selectively provide reactivity for only the reaction c→c', by incorporating the catalytic sites with surfaces accessible only through openings of a size which will allow c and c' to pass but will not be penetrable by A and B. This type of system will be referred to as a reactant selective system. It is illustrated by writing the set of possible catalytic reactions which would normally be capable of proceeding, but wherein only one specific reactant, as well as its reaction product c', is capable of passing to and from the solid particle; which is indicated by the use of lower case letter "c" in contrast with the capital letters for the species which are too large to pass as indicated by the following:

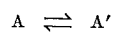

(Type I)

The net reaction which will selectively proceed is indicated by the box. In principle, of course, there may be any number of possible simultaneous reactions, as well as the ability to select more than one specific net reaction.

(2) In a process which normally transforms a species into alternate products b, C, D, etc., the reaction to form, say C, may be catalyzed wherein a and b molecules are of a size smaller than C and D and the catalyst base filter dimension is chosen to pass only a and b.

This type of reaction will be referred to as the product selective system. It is best illustrated by one or both of the following sets of reaction schemes.

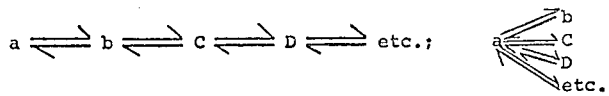   (Type II)

Again, molecular species are indicated in the lower case when they are small enough to pass the structure or as capital letters when they are not.

This embodiment of the invention is based on the very important recognition that some of the reaction products like C and D can be produced within the crystal chamber until their concentration approaches their thermodynamic equilibrium value within the chambers, but that nevertheless no net production rate as regards the external user, will or can proceed because of size restriction.

In general, the compositions are prepared by treating a precursor aluminosilicate having a pore size of from 4–6 Angstrom units and a silicon to aluminum ratio of at least 1.8, with a fluid medium containing a source of hydrogen ions or ions capable of conversion thereto to provide an alumnosilicate which is crystalline or crypto-crystalline, i.e., those materials having structures that, through crystalline, are so fine that no distinct crystals are recognizable.

The catalyst compositions are preferably prepared by treating a precursor aluminosilicate with an aqueous medium containing a source of hydrogen ions or ions capable of conversion thereto, e.g., an ammonium ion. The pH value of the fluid medium may vary within wide limits depending upon the precursor aluminosilicate and its atomic array of silicon and aluminum. Where the aluminosilicate material has an atomic ratio of silicon to aluminum greater than about 1.8, the fluid meduim may contain a hydrogen ion, ammonium ion, or a mixture thereof, equivalent to a pH value ranging from less than 1.0 up to a pH value of 12.0. Within these limits, pH values for a fluid media containing an ammonium ion range from 4.0 to 10.0, and are preferably between a pH value of 4.5 and 8.5. For fluid media containing a hydrogen ion, the pH values range from less than 1.0 up to about 7.0, and are preferably within the range of less than 1.0 up to 4.5. Where ammonium ions are employed either alone or in combination with hydrogen ions, the pH value ranges from 4.5 to 9.5 and is preferably within the limit of 4.5 to 8.5. Where the aluminosilicate material has an atomic ratio of silicon to aluminum less than about 3.0, the preferred medium is a fluid medium containing an ammonium ion.

In carrying out the treatment with the fluid medium, the procedure comprises contacting an aluminosilicate precursor with the desired fluid medium under suitable conditions until such time as metallic ions originally associated with the precursor material are either totally replaced or partially replaced with non-metallic ions of positive valence to the extent that the metal ion precursor represents from 0.01 to 90 percent, preferably 0.01 to 50 percent, of the total equivalents of ions of positive valence per gram atom of aluminum. Effective treatment with the fluid medium to obtain the corresponding acid aluminosilicate will vary the duration of the treatment and temperature at which it is carried out. Such treatments are governed also by equilibrium considerations. Elevated temperatures tend to hasten the speed of treatment whereas the duration thereof varies inversely with the hydrogen ion or ammonium ion concentration of the fluid medium. In general, it may be stated that the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 4 and 8 and is essentially free of cations. The aluminosilicate is thereafter dried to remove the liquid water phase and preferably activated by heating at temperatures ranging from about 400° F. to 1500° F. whereby ammonium ions, if present, undergo conversion to hydrogen ions.

The aluminosilicate material may be analyzed for metallic ion content by methods well known in the art. Analysis may also be made by analyzing the effluent wash for cations.

The actual procedure employed for carrying out the fluid treatment on the aluminosilicate may be accomplished in a batch-wise or continuous method under atmospheric, subatmospheric or superatmospheric pressure. A solution of the hydrogen ion and/or ammonium ion, in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogenous pressure. Similarly, treatments involving fusion or vapor phase contact may be employed providing the melting point or vaporization temperature of the acid or ammonium compound is below the decomposition temperature of the particular aluminosilicate employed.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic aicd ($H_2NSO_3H$), amidodisulfonic acid $$[NH(SO_3H)_2]$$

chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$), hydroxylamine disulfonic acid [$(HSO_3)_2NOH$], nitric acid, nitrous acid, hyponitrous acid, phosphoric acid, phosphorous acid, carbonic acid and the like.

Typical organic acids which find utility in the practice of the invention can include the monocarboxylic, dicarboxylic and polycarboxylic acids which can be aliphatic, aromatic or cycloaliphatic in nature.

Still other classes of compounds which can be employed are non-metallic "onium" type compounds which can be decomposed or oxidized to provide hydrogen ions when an aluminosilicate treated with a solution of said type compound is subjected to temperatures below the decomposition temperature of the aluminosilicate.

Representative compounds which, in aqueous solution provide "onium" compounds include, among others, ammonium compounds, substituted ammonium compounds, highly basic water soluble amines, tetraalkyl ammonium salts, as well as phosphorous analogs thereof.

Representative ammonium compounds which can be employed include ammonium chloride, ammonium hydroxide, ammonium bromide, ammonium iodide, ammonium carbonate, ammonium bicarbonate, ammonium sulfate, ammonium sulfide, ammonium thiocyanate, ammonium dithiocarbonate, ammonium peroxysulfate, ammonium acetate, ammonium tungsten, ammonium hydroxide, ammonium molybdate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartarate, and the like. Still other ammonium compounds which can be employed include tetraalkyl and tetraaryl ammonium salts such as tetramethylammonium hydroxide, trimethylammonium hydroxide. Other compounds which can be employed are nitrogen bases such as guanidine, pyridine, quinoline, etc., and strongly basic amines such as hydrazine, methylamine, ethylenediamine, tetramethylammonium hydroxide and the like.

It is to be understood that, although reference has been made to aluminosilicates as precursor materials, it is intended to include other materials which have an analogous structure to aluminosilicates resulting from isomorphous substitution of some or all of the atoms of aluminum or silicon with other elements, e.g., substitution of germanium for silicone and/or gallium for aluminum.

The composition prepared in accordance with the invention provides a means for obtaining exceptionally good catalysts. While the aluminosilicate may contain varying amounts of silicon and aluminum, it has been found that good results can be obtained through use of crystalline aluminosilicates having atomic ratios of silicon to aluminum of at least 1.8 and preferably at least about 2.8.

The aluminosilicate catalyst prepared in the foregoing manner may be used as a catalyst per se or as intermediates in the preparation of further modified contact masses consisting of a porous matrix and the aluminosilicate. The catalysts may be used in powdered, granular or molded form or formed into spheres, pellets, or finely divided particles having a particle size of 500 mesh or larger (Tyler). In cases where the catalyst is molded such as by extrusion, the aluminosilicate may be extruded. The catalyst product is then preferably precalcined in an inert atmosphere near or above the temperature contemplated for conversion but may be calcined initially during use in the conversion process. Generally, the aluminosilicate is dried between 150° F. and 500° F. and thereafter calcined in air or an inert atmosphere of nitrogen, hydrogen, helium, flue gas or other inert gas at temperatures ranging from 400° F. to 1500° F. for periods of time ranging from 1 to 48 hours or more.

The term "porous matrix" includes organic and/or inorganic compositions with which the aluminosilicates can be combined, dispersed or otherwise intimately admixed wherein the matrix may be active or inactive. It is to be understood that porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregate, pumice, firebrick, diatomaceous earths, activated charcoal, refractory oxides, organic resins, such as polyepoxides, polyamines, polyesters, vinyl resins, phenolics, amino resins, melamines, acrylics, alkyds, epoxy resins, etc., and inorganic oxide gels.

A preferred embodiment of the invention is the use of finely divided aluminosilicate catalyst particles in a porous matrix consisting of an inorganic oxide gel wherein the catalyst is present in such proportions that the resulting product contains about 2 to 90% by weight, preferably about 50 to 90% by weight, of the aluminosilicate in the final composite.

The aluminosilicate-porous matrix compositions can be prepared by several methods wherein the aluminosilicate is reduced to a particle size less than 40 microns, preferably within the range of 1 to 10 microns, and intimately admixed with an inorganic oxide gel while the latter is in the hydrous state such as in the form of hydrosol, hydrogel, wet gelatinous precipitate or a mixture thereof. Thus, finely divided active aluminosilicate can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalysts such as described in U.S. Pat. 2,384,946. The aluminosilicate-inorganic oxide gel thus obtained is washed free of soluble salts and thereafter dried and/or calcined as desired. If the total alkali metal content of the resulting composite, including alkali metals which may be present in the aluminosilicate as an impurity is too high, it can be reduced by treatment with the fluid mediums above described.

In a like manner, the active aluminosilicate may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide, which, upon drying, is converted to alumina. The aluminosilicate may be incorporated with the aluminiferous oxide while the latter is in the form of hydrosol, hydrogel or wet gelatinous precipitate of hydrous oxide.

The porous matrix may also consist of a semiplastic or plastic clay material. The aluminosilicate can be incorporated into the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc.

The porous matrix may also consist of a plural gel comprisisng a predominant amount of silica with one or more metal oxides thereof selected from Groups I–B, II, III, IV, V, VI, VII and VIII of the Periodic Table. Particular preference is given to the plural gels or silica with metal oxides of Groups II–A, III and IV–A of the Periodic Table, especially wherein the metal oxide is magnesia, alumina, zirconia, titania, beryllia, thoria or combinations thereof. The preparation of plural gels is well known and generally involves either separate precipitation or coprecipitation techniques in which a suitable salt of the metal oxide is added to an alkali metal silicate to obtain the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, chromium, cobalt, tungsten, uranium, manganese, lead, zinc, calcium, magnesium, barium, lithium, nickel and their compounds as well as silica, alumina, silica-alumina, or other siliceous oxide combinations as fines in amounts ranging from 0.5 to 40 percent by weight based on the finished catalyst.

Other preferred matrices include powdered metals, such as aluminum, stainless steel, and powders of refractory oxides, such as alumina, etc., having very low internal pore volume. These materials have substantially no inherent catalytic activity of their own.

It is to be understood that the selection of materials and methods of compositing may vary widely, and that the particular methods and materials chosen should be such that the essential characteristics of the acid aluminosilicate are preserved.

As a further embodiment of the invention, aluminosilicate catalysts having exceptionally high orders of activity can be prepared by incorporating a precursor metal aluminosilicate in a porous matrix such as silica-alumina, for example, and thereafter contacting the aluminosilicate with the above described fluid medium. The treatment is carried out for a sufficient period of time under conditions previously described for obtaining active aluminosilicates.

The materials prepared in the foregoing manner are effective catalysts for a wide variety of chemical reactions wherein the differentiation between linear aliphatic molecules, such as normal olefins and normal paraffins, from all other molecules, such as aromatic, iso-paraffins, iso-olefin or cyclic structures, is desired. As is known, aluminosilicates having a pore size of about 5 angstrom units have the ability to selectively differentiate the normal aliphatic molecules from all others. This property will serve to more specifically define the meaning of the terminology—about 5 angstrom units—as used in this description. This invention utilizes this inherent property of aluminosilicates having the necessary pore size and combines it with the unusual activity of acid aluminosilicates having a silicon to aluminum ratio of at least 1.8. Therefore, in accordance with this invention, it is possible, for example, to crack a normal aliphatic hydrocarbon such as hexane and obtain cracked products substantially free from isomeric components. Similarly, in accordance with the instant invention, it is possible to hydrate olefins, aminate olefins, dehydrate alcohols, produce esters, hydrolyze esters, dehydrogenate hydrocarbons such as propane, butylene, butane, pentane, desulfurize hydrocarbons, hydrogenate unsaturated aliphatic hydrocarbons such as monoolefins and diolefins to the substantial exclusion of the formation of products other than those having linear aliphatic molecules. Additionally, in accordance with the instant invention, it is also possible to selectively react one component in a feed stream to the substantial exclusion of the other. Thus, for example, it is possible to selectively crack a normal, aliphatic hydrocarbon, e.g., hexane from a mixture of said normal hydrocarbon, with compounds other than linear aliphatic compounds such as iso-aliphatic hydrocarbons, naphthenic hydrocarbons and aromatic hydrocarbons. In like manner, the instant invention provides for the selective reaction of one component of the feed stream to the substantial exclusion of all other components for dehydrogenation, hydrogenation, dehydration, etc. The catalysts may be used as described or may have added metals or metal compounds associated with them, such as platinum, molybdenum, molybdenum oxides, etc. Such association will be useful in carrying out hydrogenative reactions including hydrocracking.

The following examples will illustrate the best mode now contemplated for carrying out the invention.

EXAMPLE 1

Gmelinite, a naturally occurring aluminosilicate was ground to a particle size of about 5 microns, and 5 cublic centimeters thereof subjected to three treatments at 180° F. with 10 milliliters of a 25 percent by weight aqueous solution of ammonium chloride for periods of time of 4, 24 and 28 hours, respectively. The ammonium chloride solution was decanted and the aluminosilicate was washed with three 15 milliliter portions of water, dried overnight at 240° F., and then calcined for 15 minutes in air at 1000° F.

The above catalyst, as well as a sample of untreated gmelinite, was then evaluated for cracking normal hexane. The procedure employed involved passing a helium stream carrying normal hexane vapor at a flow rate of 10 cubic centimeters per minute over a 1.5 cubic centimeters bed of catalyst and measuring the conversion at selected time intervals.

During the evaluation, the catalysts were regenerated at selected intervals, e.g., 65 minutes for untreated gmelinite, by passing air over them at 1000° F. at a flow rate of 5 cc. per minute for a period of time ranging from about 15 to 45 minutes.

The results obtained are shown in the following tables:

TABLE I

Normal hexane cracking over untreated gmelinite

|  | Temperature, ° F. | Conversion |
|---|---|---|
| Time on stream: |  |  |
| 10 min | 1,000 | 7 |
| 37 min | 1,000 | 2.5 |
| 65 min | 900 | 1.2 |
| Air regenerated: |  |  |
| 11 min | 1,000 | 1.7 |
| 38 min | 1,000 | 1.5 |

Normal hexane cracking over treated gmelinite

| Time on stream: |  |  |
|---|---|---|
| 12 min | 1,000 | 80.7 |
| 42 min | 700 | 19 |
| Air regenerated: |  |  |
| 10 min | 600 | 54.9 |
| 41 min | 600 | 34.6 |
| 11 min | 500 | 25.5 |
| 32 min | 300 | 3.9 |
| 56 min | 300 | 5.6 |

EXAMPLE 2

The catalyst prepared in accordance with Example 1 was utilized for cracking 2-methylpentane, methylcyclopentane and normal hexane. The results are shown in the following table.

TABLE II

| Charge | Temperature, ° F. | Conversion, percent |
|---|---|---|
| 2-methylpentane | 600–1,000 | 0–0.7 |
| Methylcyclopentane | 950–1,000 | 0.4–1.9 |
| Normal hexane | 1,000 | 80.7 |
| Do | 750 | 46.6–30.1 |
| Do | 300 | 3.9–5.5 |

This experiment demonstrates the shape selectivity and activity of the gmelinite treated in accorance with the process of this invention. It can be seen that the extremely low conversion for 2-methylpentane observed at a temperature as high as 1000° F. shows that the shape selectivity factor for the cracking of only straight chain hydrocarbons is unusually high.

EXAMPLE 3

Chabazite, a naturally occurring aluminosilicate was ground to a particle size of about 5 microns and 5 cubic centimeters of this material were subjected to 3 treatments at 1800 F. with 10 milliliters of a 25 percent by weight aqueous solution of ammonium chloride for periods of time of 4, 25 and 28 hours, respectively. The ammonium chloride solution was decanted. The aluminosilicate was washed with 350 milliliter portions of water, dried overnight at 240° F. and then calcined for 15 minutes in air at 1000° F.

The following table will illustrate the evaluation of the activated chabazite as opposed to the untreated or natural chabazite in the cracking of various hydrocarbon charges at 1000° F.:

TABLE III

| Charge | Time on stream, min. | Percent conversion | Catalyst form |
|---|---|---|---|
| Normal hexane | 10 | 6.4 | Natural. |
| Do | 40 | 4.6 | Do. |
| Do | 10 | 61.2 | Activated. |
| Do | 40 | 68.4 | Do. |
| 2-methylpentane | [1] 10 | 1.5 | Do. |
| Do | 40 | 1.5 | Do. |
| Normal hexane | [2] 100 | 73.2 | Do. |

[1] After regeneration. [2] Before regeneration.

The above table not only illustrates the superior activity of an aluminosilicate treated in accordance with this invention as opposed to the untreated aluminosilicate, but also indicates the high degree of selectivity of the catalysts of the instant invention in that only 1.5% conversion of 2-methylpentane occurred at a temperature as high as 1000° F.

It should be noted that the above evaluation was carried out at drastic conditions to dramatically illustrate the unusual activity and selectivity of the catalysts of this invention. Thus, after 40 minutes of feeding n-hexane, the catalyst was regenerated and 2-methylpentane was then fed with substantially no conversion. After an additional 40 minutes and *without* regeneration, the feed was again changed to n-hexane and 73.2% conversion was obtained.

EXAMPLE 4

Five grams of chabazite were contacted at room temperature with about 15 grams of a 23% aqueous solution of ammonium sulfide for 4 hours and this procedure was repeated twice with fresh solutions of ammonium sulfide. The ammonium sulfide solution was decanted and the aluminosilicate was washed with three 15 milliliter portions of water, dried overnight at 240° F. and then calcined for 15 minutes in air at 1000° F. The following table shows the cracking data obtained when the air regenerated catalyst was evaluated for cracking normal hexane.

TABLE IV

| Activated chabazite | Time on stream | Temperature, ° F. | Percent conversion |
|---|---|---|---|
| No air regeneration | 5 | 1,000 | 79.7 |
| Air regenerated | 5 | 1,000 | 87.8 |
|  | 27 | 1,000 | 74.8 |
| Do | 5 | 700 | 37.6 |
|  | 26 | 700 | 37.4 |
| Do | 26 | 600 | 25.1 |
| Do | 71 | 450 | 3.4 |
| Do | 5 | 1,000 | 80.6 |
|  | 25 | 1,000 | 68.8 |

In the above table the air regeneration was carried out by passing air over the spent catalyst of 1000° F. at a flow rate of 5 cubic centimeters per minute for 15-45 minutes.

EXAMPLE 5

5 cc. of a naturally occurring aluminosilicate identified as Offretite were contacted with 20 milliliters of a 1.0 normal hydrochloric acid solution for 20 minutes at 76° F. and then filtered and washed with 50 cc. water. The above procedure was repeated three times after which the catalyst was dried in air at 110° C. and calcined at 1000° F. for 15 minutes.

The following table will illustrate the evaluation of the above catalyst for cracking normal hexane at a flow rate of 10 cc. per minute over 1.5 cc. of catalyst:

TABLE V

| Time on stream, min. | Temperature ° F. | Conversion |
|---|---|---|
| 5 | 600 | 56.9 |
| 28 | 600 | 33.1 |

EXAMPLE 6

5 cc. of a naturally occurring aluminosilicate identified as Offretite were contacted with 14 milliliters of a 25 percent by weight aqueous solution of ammonium chloride for 2 hours at 76° F., followed by decanting the excess liquid. This procedure was repeated three times and the catalyst was then washed with 20 cc. water, filtered, air dried at 77° F. and calcined for 15 minutes at 1000° F.

The following table will illustrate the evaluation of the above catalyst when it was employed for cracking hydrocarbons at a flow rate of 10 cc. per minute over 1.5 cc. of catalyst:

TABLE VI

| Charge | Temperature, ° F. | Time on stream, min. | Conversion |
|---|---|---|---|
| n-Hexane | 600 | 5 | 84.0 |
| Do | 600 | 26 | 52.1 |
| Do | 500 | 25 | 23.7 |
| Methylpentane | 800 | 5 | 2.6 |
| Do | 800 | 26 | 1.0 |
| Do | 1,000 | 5 | 7.6 |
| Do | 1,000 | 26 | 4.7 |

The above table not only illustrates the superior activity of the novel catalysts of this invention by the high degree of conversion obtained for cracking normal hexane, but also illustrates their selectivity in that extremely low conversion of methylpentane was obtained.

EXAMPLE 7

The procedure of Example 6 was repeated with the exception that a 22.8 weight percent solution of ammonium sulfide was employed in place of the ammonium chloride.

The catalytic evaluation is shown in the following table:

TABLE VII

| Charge | Temperature, ° F. | Time on stream, min. | Conversion |
|---|---|---|---|
| n-Hexane | 600 | 5 | 75.6 |
| Do | 600 | 26 | 48.0 |
| Do | 1,000 | 6 | 96.4 |
| Do | 1,000 | 27 | 80.1 |
| Methylpentane | 600 | 5 | 0.4 |
| Do | 600 | 26 | 0.2 |
| Do | 600 | 26 | 0.2 |
| Do | 1,000 | 5 | 6.7 |
| Do | 1,000 | 26 | 3.8 |

EXAMPLE 8

3 cc. of a naturally occurring aluminosilicate obtained from Hall's Harbour, Nova Scotia, and identified as stilbite, were contacted with 12 cc. of a 25 weight percent aqueous ammonium chloride solution for 4 separate contacts, washed with 15 milliliters of water, dried and calcined.

The following table illustrates the evaluation of the above catalyst when employed for cracking various hydrocarbon charges at a flow rate of 10 cc. per minute:

TABLE VIII

| Charge | Temperature, ° F. | Time on stream, min. | Conversion |
|---|---|---|---|
| Normal hexane | 900 | 10 | 53.3 |
| Do | 900 | 35 | 37.2 |
| Do | 900 | 60 | 30.2 |
| Do | 700 | 10 | 11.1 |
| Do | 700 | 37 | 6.6 |
| Do | 700 | 62 | 5.6 |

EXAMPLE 9

The procedure of Example 8 was repeated with the exception that a 22.8 weight percent ammonium sulfide solution was employed in place of the amonium chloride.

The following table illustrates the evaluation for catalyst:

TABLE IX

| Charge | Temperature, °F. | Time on stream, min. | Conversion |
|---|---|---|---|
| Normal hexane | 900 | 10 | 13.7 |
| Do | 900 | 30 | 8.6 |
| Do | 1,000 | 10 | 56.7 |
| Do | 1,000 | 30 | 42.1 |
| Do | 1,000 | 50 | 42.3 |
| Methylpentane | 1,000 | 5 | 0.6 |
| Do | 1,000 | 25 | 0.5 |

What is claimed is:

1. A continuous method for selectively cracking normal aliphatic hydrocarbons from a mixture of the same with at least one other hydrocarbon selected from the group consisting of isoaliphatic hydrocarbons, naphthenic hydrocarbons, and aromatic hydrocarbons which comprises bringing said mixture at catalytic cracking conditions into contact with a crystalline acid aluminosilicate having a pore size of about 5 angstrom units and a silicon to aluminum ratio of at least 1.8 wherein the normal aliphatic hydrocarbon component is admitted into the interior of said aluminosilicate to the exclusion of the other hydrocarbon components and removing the resulting products of cracking said normal aliphatic hydrocarbon component from said aluminosilicate.

2. The method of claim 1 wherein said aluminosilicate is acid chabazite.

3. The method of claim 1 wherein said crystalline aluminosilicate is acid stilbite.

4. The method of claim 1 wherein said crystalline aluminosilicate is acid gmelinite.

5. The method of claim 1 wherein said crystalline aluminosilicate is acid levynite.

6. The method of claim 1 wherein said crystalline aluminosilicate is acid analcite.

7. The method of claim 1 wherein said crystalline aluminosilicate is acid offretite.

8. The process of claim 1 wherein said acid aluminosilicate is dispersed in a porous matrix.

9. The process of claim 8 wherein said porous matrix is an inorganic oxide gel.

10. A method for selectively hydrocracking an organic compound having a linear aliphatic structure which comprises contacting said compound and hydrogen under hydrocracking conditions with a crystalline acid aluminosilicate having a pore size of from 4 to 6 angstrom units and a silicon to aluminum ratio of at least 1.8.

11. A method for selectively hydrocracking an organic compound which comprises contacting a mixture of hydrocrackable compounds of different molecular sizes, at least one of which has a linear aliphatic structure, and hydrogen under hydrocracking conditions with a crystalline acid-aluminosilicate having a pore size of about 5 angstrom units and a silicon to aluminum ratio of at least 1.8 so that the aluminosilicate will selectively crack only the compound with the linear aliphatic structure.

12. The method of claim 11 wherein said aluminosilicate is acid chabazite.

13. The method of claim 11 wherein said crystalline aluminosilicate is acid stilbite.

14. The method of claim 11 wherein said crystalline aluminosilicate is acid gmelinite.

15. The method of claim 11 wherein said crystalline aluminosilicate is acid levynite.

16. The method of claim 11 wherein said crystalline aluminosilicate is acid analcite.

17. The method of claim 11 wheerin said crystalline aluminosilicate is acid offretite.

18. The method of claim 11 wherein said acid aluminosilicate is dispersed in a porous matrix.

19. The method of claim 18 wherein said porous matrix is an inorganic oxide gel.

20. A continuous method for selectively hydrocracking hydrocrackable normal aliphatic hydrocarbons from a mixture of the same with at least one other hydrocarbon selected from the group consisting of isoaliphatic hydrocarbons, naphthenic hydrocarbons, and aromatic hydrocarbons which comprises contacting said mixture and hydrogen at catalytic hydrocracking conditions with a crystalline acid aluminosilicate having a pore size of about 5 angstrom units, a silicon to aluminum ratio of at least 1.8, and having a hydrogenation component associated therewith.

21. The method of claim 20 wherein normal paraffins are selectively hydrocracked from a mixture of the same with aromatic compounds.

References Cited

UNITED STATES PATENTS

| 2,962,435 | 11/1960 | Fleck et al. | 208—120 |
| 2,971,904 | 2/1961 | Gladrow et al. | 208—135 |
| 2,983,670 | 5/1961 | Seubold | 208—110 |
| 3,039,953 | 6/1962 | Eng | 208—26 |
| 3,140,251 | 7/1964 | Plank et al. | 208—120 |
| 3,140,253 | 7/1964 | Plank et al. | 208—119 |
| 3,140,322 | 7/1964 | Frilette et al. | 208—120 |

DELBERT E. GANTZ, Primary Examiner

U.S. Cl. X.R.

208—120